Sept. 17, 1957   L. N. GRAFINGER ET AL   2,806,353
MACH NUMBER COMPUTER
Filed Feb. 9, 1952   2 Sheets-Sheet 1

INVENTORS
LOUIS N. GRAFINGER
BERNARD J. O'CONNOR
BY Herbert L Davis
ATTORNEY

Sept. 17, 1957  L. N. GRAFINGER ET AL  2,806,353
MACH NUMBER COMPUTER
Filed Feb. 9, 1952  2 Sheets-Sheet 2

INVENTORS
LOUIS N. GRAFINGER
BERNARD J. O'CONNOR
BY Herbert L Davis
ATTORNEY

United States Patent Office 2,806,353
Patented Sept. 17, 1957

2,806,353

MACH NUMBER COMPUTER

Louis N. Grafinger, Paramus, N. J., and Bernard J. O'Connor, Tuckahoe, N. Y., assignors to Bendix Aviation Corporation, Teterboro, N. J., a corporation of Delaware Application February 9, 1952, Serial No. 270,846

19 Claims. (Cl. 60—39.28)

The present application relates to improvements in a Mach meter or Mach number computer for use in an air-fuel ratio control system of a ram jet engine which may be of a type such as disclosed and claimed in the copending application Serial No. 159,781, filed May 3, 1950, by Joel D. Peterson and assigned to Bendix Aviation Corporation, now Patent No. 2,765,619, issued October 9, 1956.

A ram jet engine cannot start operating by itself and a missile powered by a ram jet engine needs to be launched from a suitable apparatus or other aircraft, and once the ram jet is started, it will sustain itself in flight by generating its own power.

An object of the present invention is to provide a Mach number computer for use in a missile to control the ram-jet fuel system and thereby the thrust of the missile so as to accelerate it to a predetermined Mach number (of, for example, 2.0) in the minimum time after launching, and to maintain the missile at this Mach number for the remainder of the flight. Thus, while maximum thrust is demanded after booster separation, it must be reduced as the missile approaches the predetermined Mach number so that an overshoot to a dangerously high Mach number will not occur.

Another object of the invention is to provide a novel Mach number computer and more particularly a novel electrical servo-motor control circuit for computing the Mach number and for indicating both the Mach number and rate-of-change of Mach number.

Another object of the invention is to provide a novel electrical control circuit for computing Mach number determined by the ratio between the total pressure or ram air inlet pressure sensed at the mouth of a Pitot tube and the static or ambient atmospheric pressure prevailing at the level of flight.

Another object of the invention is to provide such an electrical computer circuit including a variable coupling feed-back transformer having applied at the output thereof a voltage proportional to the total pressure sensed at the mouth of the Pitot tube and an input excited by a voltage which varies with the static atmospheric pressure and in which means is provided for effecting a biasing voltage in the output of the variable coupling transformer to shift the range thereof so as to avoid the zero point of the variable coupling transformer, including means to vary the biasing voltage with changes in the static or prevailing atmospheric pressure so that by compensating the bias voltage for changes in the static pressure, a servo motor controlled by the computer circuit may effect a unique position of the variable coupling transformer for each ratio between the sensed pressures.

Another object of the invention is to provide a novel Mach number computer circuit which derives the Mach number from the approximate equation $M = 0.93 + 0.189\, P_{t_0}/P_0$ in which the term $P_{t_0}$ equals the total or ram air inlet pressure and the term $P_0$ equals static or ambient atmospheric pressure. In the subject computer circuit one of the inputs to the Mach number computer circuit is a voltage proportional to the total or ram-air inlet pressure, and a second input is a voltage proportional to the static pressure so that a servo motor controlled by the computer circuit drives an output shaft so that its position is proportional to the ratio $P_{t_0}/P_0$ and positions a variable coupling transformer or linear resolver on this shaft so that its output voltage is proportional to the deviation from the desired Mach number and the computed Mach number and in which there is further driven by the servo motor shaft a rate generator having an output voltage proportional to the rate-of-change of Mach number and in which the Mach number error voltage and the rate-of-change of Mach number error voltage are summed to give a proportional-plus-rate control signal.

In such a control circuit, since changes in the static pressure causes corresponding changes in the excitation of a follow-up variable-coupling transformer, the loop gain of the servo varies proportionately with the static pressure signal. However, a change in loop gain in the computer will introduce a greater dynamic lag in the computation and will also decrease the static accuracy of the computation. An object of the invention, therefore, is to eliminate the change in loop gain by providing a novel altitude compensator to maintain the loop gain at a constant value within ±20 percent of the mean value, whereas with no compensation the loop gain would vary by the ratio of the maximum to the minimum value of static pressure, for example, a ratio of ten.

Since such gain varies approximately as $$\frac{1}{P_0}$$

an object of the invention is to provide a novel altitude compensator in which the hyperbolic relationship between gain and the static pressure is obtained by means of a static-pressure bellows and a novel system of springs so that a variable-coupling transformer geared to the bellows assembly provides the means for modifying the servo loop gain, since the coupling between the rotor and stator of the transformer is proportional to the bellows deflection.

The above and other objects and features of the invention will appear more fully hereinafter from a consideration of the following description taken in connection with the accompanying drawings wherein one embodiment of the invention is illustrated by way of example.

Referring to the drawings wherein like reference characters designate like parts:

Figure 1:
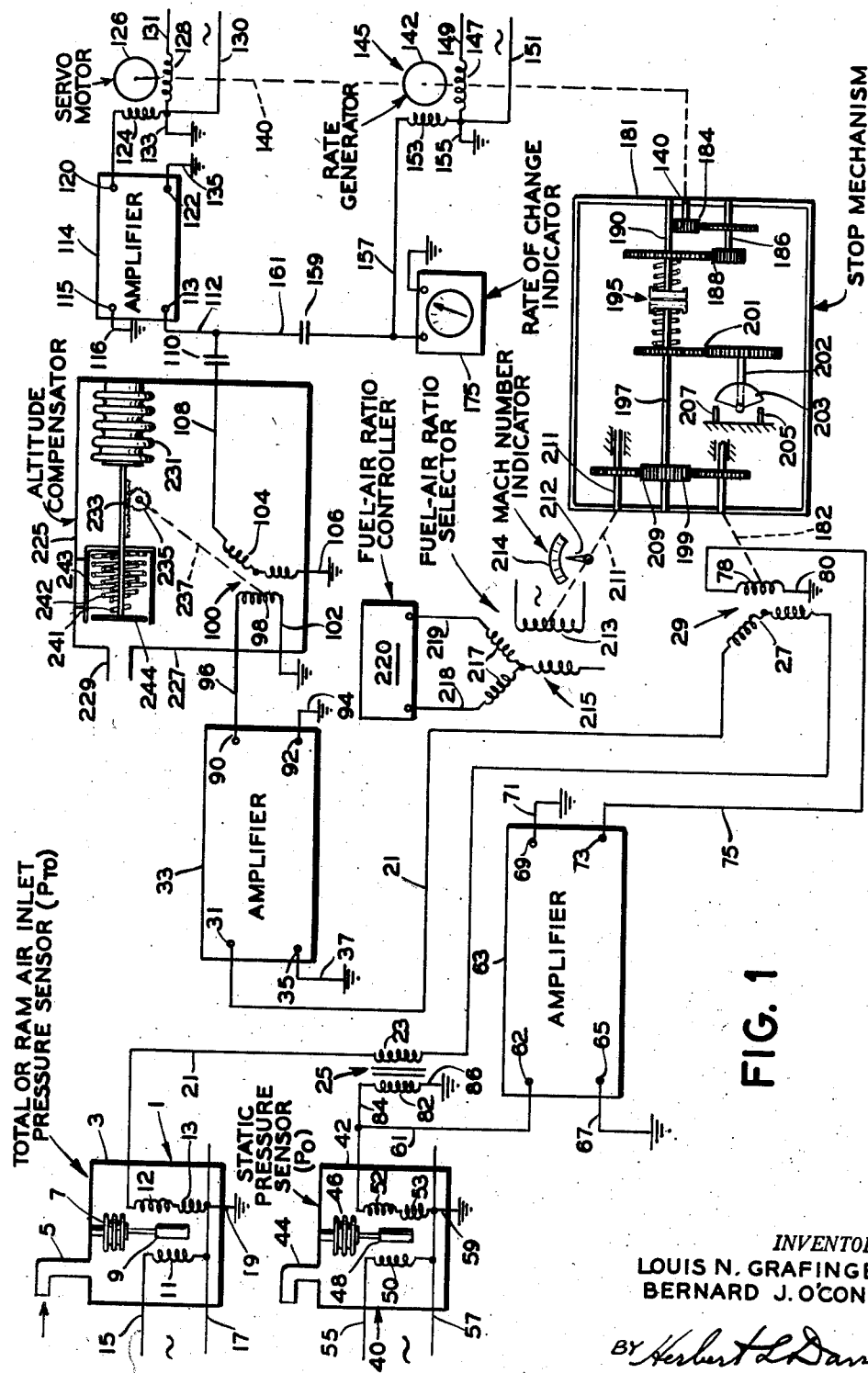
Figure 1 is a schematic diagram of the Mach number computer.

Referring now to the drawing of Figure 1, there is shown diagrammatically the computer device in which there is provided a ram air inlet pressure sensor 1 including a chamber 3 having its interior connected through a conduit 5 to the ram air inlet pressure or to the mouth of a Pitot tube so as to sense the shock wave at the mouth of the Pitot tube.

Mounted within the chamber 3 is a suitable bellows 7 responsive to ram air inlet pressure applied through conduit 5. The bellows 7 may be evacuated and spring loaded so as to expand upon a decrease in the sensed total pressure acting exteriorly on the bellows 7 and contract upon an increase in the sensed total pressure.

Operatively connected to the bellows 7 is a suitable magnetic core or iron slug 9 adjustably positioned in relation to a primary winding 11 and secondary windings 12 and 13 of an inductive transformer so as to vary the coupling relation between the primary winding 11 and the secondary windings 12 and 13 with changes in the sensed ram air inlet pressure.

The primary winding 11 is connected by conductors 15 and 17 across a main source of constant frequency alternating current and inductively coupled to reversely wound secondary windings 12 and 13. The coupling relation between the primary winding 11 and windings 12 and 13 varies depending upon the adjusted position of the magnetic core 9. Thus, at an extreme position of the magnetic core 9 under conditions, for example, when the ram air inlet pressure is zero p. s. i. absolute and the bellows 7 has expanded to its maximum position, the signal induced in the windings 12 and 13 will be balanced and the net output will be zero. However, upon the ram air inlet pressure increasing contraction of the bellows 7 will cause the iron core 9 to move upward causing an unbalanced relationship between the voltages induced in windings 12 and 13 and effecting in turn an increase in the electrical signal applied across the output lines with increase in ram air inlet pressure, i. e., the signal across the common ground connection 19 and output conductor 21.

The output conductor 21 has serially connected therein a secondary winding 23 of a biasing transformer 25, as hereinafter explained, and a secondary stator winding 27 of a variable coupling transformer 29. As shown in Figure 1 the conductor 21 leads to an input 31 of an amplifier 33 having its other input 35 connected by a conductor 37 to a common ground connection and thus to the electrical output of the ram air inlet pressure sensor 1.

Also affecting the signal to the input of the amplifier 33 is a static pressure sensor 40 including a chamber 42 having its interior connected through a conduit 44 to the static pressure or ambient atmospheric pressure at the level of flight of the aircraft, which may be sensed by the Pitot tube at a point after the shock wave.

Mounted within the chamber 42 is a suitable bellows 46 responsive to the static pressure applied through conduit 44. The bellows 46 may be evacuated and spring loaded so as to expand upon a decrease in the sensed static pressure acting exteriorly upon the bellows 46 and contract upon an increase in the static pressure. Operatively connected to the bellows 46 is a suitable magnetic core or an iron slug 48 adjustably positioned in relation to a primary winding 50 and secondary windings 52 and 53 of an inductive transformer so as to vary the coupling relation between the primary winding 50 and the secondary windings 52 and 53 with changes in the sensed static pressure.

The primary winding 50 is connected by conductors 55 and 57 across the main source of constant frequency alternating current and inductively coupled to reversely wound secondary windings 52 and 53. The coupling relation between the primary winding 50 and the windings 52 and 53 varies depending upon the adjusted position of the magnetic core 48.

Thus, at an extreme position of the magnetic core 48 under conditions, for example, when the static pressure is zero p. s. i. absolute and the bellows 46 has expanded to its maximum position, the signal induced in the windings 52 and 53 will be balanced and the net output will be zero.

However, upon the static pressure increasing, contraction of the bellows 46 will cause the iron core 48 to move upward causing an unbalanced relationship between the voltages induced in windings 52 and 53, and, thus, effecting in turn an increase in the electrical signal applied across the output lines with increase in static pressure, i. e., the signal across the common ground connection 59 and output conductor 61.

As shown in Figure 1, the conductor 61 leads to an input 62 of an amplifier 63, having its other input 65 connected by conductor 67 to a common ground connection and, thus, to the electrical output of the static pressure sensor 40.

The amplifier 63 is of a conventional type and has an output connection 69 connected by a conductor 71 to a common ground and another output connection 73 connected by conductor 75 to a rotor-winding 78 of the variable coupling transformer 29. The opposite end of the rotor-winding 78 is connected by conductor 80 to a common ground so that the rotor-winding 78 of the variable coupling transformer 79 is connected across the amplifier 73.

The variable coupling transformer 29 is of a conventional type having a pair of stator windings 27 reversely wound and arranged so that rotor-winding 78 may be adjusted in inductive relation thereto over a predetermined range.

The output voltage from the variable coupling transformer 29 will now depend upon both the excitation of the rotor winding 78 as well as the angular position of the rotor winding 78 relative to the stator windings 27.

*Biasing transformer 25*

Further biasing the voltage output of the stator windings 27 in an inverse phase relation to that of the output from the total pressure sensor 1 is the biasing transformer 25 having its secondary winding 23 serially connected in the conductor 21 and arranged so as to shift the range of the variable coupling transformer 29 so that the zero or null point thereof corresponds approximately to the mid-point of the operating range of Mach numbers.

The primary winding 82 of the biasing transformer 25 is connected by a conductor 84 to the conductor 61 and by a conductor 86 to a common ground. Thus, it will be seen that the primary winding 82 is connected across the output of the static pressure sensor 40 so that the biasing voltage introduced by the transformer 25 will increase with the voltage across the winding 78 as upon an increase in the prevailing static or ambient atmospheric pressure.

Bearing in mind that the loop circuit 21 seeks to compute the ratio between the ram air inlet pressure and the static pressure as measured by the output voltages of the sensors 1 and 40, it will be seen that it will be necessary that the biasing voltage induced by the transformer 25 be compensated for changes in the prevailing static or atmospheric pressure.

Otherwise, changes in the excitation voltage of the winding 78 measuring the sensed static pressure ($P_0$), if summed with a constant biasing voltage, would not when compared with the output voltage from the ram air inlet pressure sensor 3 ($P_{t_0}$) necessarily reflect the true ratio $$\frac{P_{t_0}}{P_0}$$

since changes in the static pressure would not affect the total voltage compared with the voltage from the pressure sensor 1 ($P_{t_0}$), but only a part thereof. However, by properly increasing the biasing voltage in direct relation with the increase in the output voltage from the static pressure sensor 40, as provided herein, the sum voltage representing a measure of the static pressure would be proportionately increased, rather than merely a part of the sum voltage so as to reflect the correct ratio between the static pressure voltage from the device 40 and the total pressure sensed voltage from the device 1.

*Control circuit*

When the rotor 78 has been adjusted to a position corresponding to the prevailing Mach number, the voltages induced in the circuit 21 by the variable coupling transformer 29 and the biasing transformer 25 will balance that induced in line 21 by the total or the ram inlet pressure sensor 1 so that no error signal would then be applied across the inlet terminals 31—35 of the amplifier 33.

However, upon the rotor 78 of the variable coupling transformer 29 being in a position such that under the prevailing pressure conditions there is a resultant error signal in one sense or the other, there will be then applied to the input 31—35 of the amplifier 33 an error signal which is then amplified through the amplifier 33 and applied to output terminals 90 and 92 of the amplifier 33. The amplifier 33 may be of a suitable conventional type and has its output terminal 92 connected by conductor 94 to a common ground, while its output terminal 90 is connected by a conductor 96 to a rotor winding 98 of a variable coupling transformer 100. The opposite terminal of the rotor winding 98 is connected by conductor 102 to a common ground. Thus, the rotor winding 98 of the variable coupling transformer 100 is connected across the output terminals 90 and 92 of the amplifier 33.

Stator windings 104 of the variable coupling transformer 100 are connected by one conductor 106 to a common ground and by a second conductor 108 through a capacitor 110 in conductor 112 to an input terminal 113 of an amplifier 114. The opposite input terminal 115 of amplifier 114 is connected by a conductor 116 to a common ground.

Amplifier 114 is of conventional type and has output terminals 120 and 122. The terminal 120 leads to a control winding 124 of a two-phase reversible electric servo motor 126 of conventional type and having a fixed phase winding 128 connected across the source of constant frequency alternating current through conductors 130 and 131. The opposite end of the control winding 124 is connected by a conductor 133 to a common ground, while the terminal output 122 of the amplifier 114 is connected by a conductor 135 to the common ground.

Thus, the control winding 124 of the servomotor 126 is connected across the output terminal 120—122 of the amplifier 114. The direction of rotation of the servomotor 126 will be determined in a conventional manner by the electrical phase of the control signal applied across the output terminal 120—122 of the amplifier 114, which is in turn dependent upon the phase of the signal applied across the input terminals 31—35 of the amplifier 33, which is dependent upon the signal voltages affecting circuit 21.

Rate generator

The servomotor 126 drives through a shaft 140 a rotor element 142 of a rate generator 145. The rate generator 142 is of a conventional type and has an input winding 147 connected by conductors 149 and 151 across the source of constant frequency alternating current. There is further provided an output winding 153 connected by conductor 155 to a common ground and by another conductor 157 through a capacitor 159 and conductors 161 and 112 to the input terminal 113 of the amplifier 114. Thus, the output winding 153 of the rate generator 145 is connected across the input terminal 113—115 of the amplifier 114.

Adjustment of the servomotor 126 in one direction or the other, effects rotation of the rate generator 145 in such a direction as to apply a rate signal across the input terminals 113 and 115 acting in inverse relation to the error signal applied across input terminals 113 and 115 so as to tend to retard and prevent over-adjustment of the servomotor 126.

The rate signal induced by the rate generator 145 is proportional to the rate-of-change of the motor 126 which in turn is proportional to the rate-of-change of the Mach number. A voltmeter 175 may be connected across the output lines 155—157 of the rate generator so as to reflect the rate-of-change of the Mach number.

Stop mechanism

Moreover, upon an error signal, the shaft 140 of the servomotor 126 drives through a stop mechanism 181 a shaft 182 to position the rotor winding 78 of the variable coupling transformer 29 in a direction so as to wipe out the error signal and rebalance the voltages in circuit 21.

The stop mechanism 181 includes gearing 184 driven by the shaft 140, a stub shaft 186, gearing 188, a second shaft 190 drivingly connected by a spring clutch 195 of conventional type to a third shaft 197. Shaft 197 in turn is connected through gearing 199 to the shaft 182. Also driven from shaft 197 is a second gearing 201, and shaft 202 connected to a member 203 which is arranged to engage at a minimum and maximum limits of adjustment of the shaft 197 suitable stop members 205 and 207, whereupon clutch 195 slips permitting shaft 190 to rotate without damage to the parts.

The stop members 205 and 207 limit the range of computation to the range wherein the computations according to the aforenoted equation $$M = 0.93 + 0.189 \frac{P_{t_0}}{P_0}$$

has sufficient accuracy to be useful.

The shaft 197 is also drivingly connected through gearing 209 to a shaft 211 which drives a pointer 212 cooperating with a suitable Mach number indicator scale 214. The shaft 211 may also drive rotor winding 213 of a variable coupling transformer 215 having reversely wound stator windings 217, which as hereinafter explained are connected by conductors 218 and 219 so as to vary the setting of a fuel-air ratio controller 220 which may be of a type such as is disclosed in the copending application Serial No. 158,781, filed May 3, 1950, by Joel D. Peterson.

Altitude compensation

In a system such as heretofore described, wherein changes in the static pressure affects a corresponding change in the excitation of the rotor winding 78, it will be seen that an increase in the output of the rotor transformer 29 may be affected due to increase in the excitation of winding 78 rather than change in the coupling relationship between windings 78 and 27 and further because of such change in excitation there may be obtained an increase in the output of the transformer 29 for degree of change in the coupling relation over that which would be affected for a lesser constant excitation of the winding 78.

To compensate for this gain, there is provided a novel altitude compensator 225 for effecting a rotor winding 98 of the variable coupling transformer 100 so as to act in the inverse sense to that of the loop gain so as to cancel out this gain change.

The altitude compensator 225 includes a chamber 227 having its interior connected through a conduit 229 to the static or ambient atmospheric pressure prevailing at the level of flight of the missile or aircraft.

Mounted within the chamber 225 is a suitable bellows 231 responsive to the static pressure applied through the conduit 229. The bellows 231 may be evacuated and spring loaded so as to expand upon a decrease in the sensed static pressure acting exteriorly upon the bellows 231 and contract upon an increase in the static pressure. Operatively connected to the bellows 231 is a rack 233 cooperating with a gear 235 to position through a shaft 237 the rotor 98 of the variable coupling transformer 100.

The gain of the altitude compensator 225 varies approximately as $$\frac{1}{P_0}$$

Figure 2:
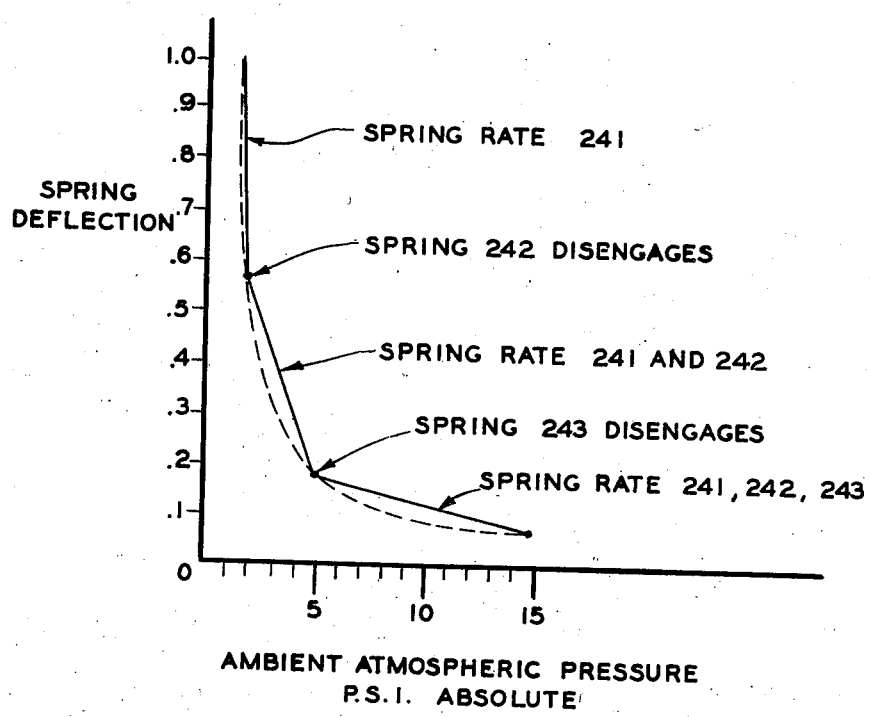
Figure 2 is a graphical illustration showing the hyperbolic characteristics of the spring and bellows arrangement of the altitude compensator of Figure 1.

The hyperbolic relationship between the gain and the ambient atmospheric pressure is obtained by means of the static pressure responsive bellows 231 and a system of springs, including springs 241, 242 and 243. Under high static pressure conditions all three of the springs 241, 242 and 243, shown in Figure 1, will engage with the bellows through an end plate 244. However, as the ambient atmospheric pressure decreases (altitude increases) first spring 243 is disengaged and then spring 242 so that for low ambient atmospheric pressure conditions only spring 241 is loading the bellows. This mechanism then gives approximately the hyperbolic function shown graphically in Figure 2. The variable coupling transformer 100 geared to the bellows assembly 231 provides a means for modifying the servo loop gain, since the coupling between the rotor winding 98 and the stator windings 104 is proportional to the bellows deflection and the coupling relation is so arranged that there will be induced into the stator winding 104 the signal modified to compensate for the loop gain; i. e., the coupling relation is such as to compensate in inverse relation for increases in the signal voltage applied across the rotor winding 78 of the variable coupling transformer 29 due to change in the prevailing atmospheric pressure.

The accuracy of the factor $$\frac{1}{P_0}$$

necessary for the Mach number computation prohibits the use of the springs and bellows arrangement in performing the Mach number calculation. The altitude compensator 225, however, maintains the loop gain at a constant value within plus or minus 20% of the mean value, whereas with no compensation the loop gain would vary by the ratio of the maximum to the minimum values of static pressure, for example, 10.

Operation

The subject Mach number computer is a device for computing Mach number from ram air inlet pressure and the ambient atmospheric pressure. For a range of Mach numbers $M=1.5$ to $M=2.5$ the Mach number may be approximated with sufficient accuracy by the following equations:

$$M = 0.189 \frac{P_{t_0}}{P_0} + 0.93$$

$P_{t_0}$=Total or ram pressure sensed at the mouth of the Pitot tube (shock wave at Pitot mouth)
$P_0$=Static or ambient atmospheric pressure sensed after the shock wave by Pitot tube.

The pressures $P_{t_0}$ (total pressure) and $P_0$ (static pressure) are the inputs to the Mach number computer. The computer performs the computation of the foregoing equation, the result being a shaft 182 and 211 position which varies with Mach number.

A variable coupling transformer 215 having a rotor winding 213 coupled to the output shaft 211 converts the position of the rotor winding 213 to a signal voltage proportional to the deviation from a desired Mach number for controlling through lines 218 and 219 the setting of a fuel-air ratio control system 220 of the jet engine so as to maintain the Mach number at the desired value.

The control system indicated by the numeral 220 may be of any suitable type and a typical system with which the Mach number computer may be used is described and claimed in the copending application Serial No. 159,781, filed May 3, 1950, by Joel D. Peterson and assigned to Bendix Aviation Corporation.

In such a system the rotor winding 213 is connected across the main source of alternating current and inductively coupled to the stator windings 217 of the variable coupling transformer 215. The variable coupling transformer 215 is of a conventional type having a pair of stator windings 217 reversely wound and arranged so that rotor winding 213 when adjusted to a predetermined balance point bisects the angle made by the juncture of the two active stator windings 217 so as to effect a zero signal when the Mach number is at the desired value of, for example two; while adjustment of the rotor winding 213 to one side of the balance point effects a signal voltage across lines 218 and 219 of one phase and adjustment to the other side of the balance point a signal voltage of the opposite phase when the Mach number is below or above the desired Mach number, as the case may be, so as to cause the jet engine control system 220 to effect the fuel-air ratio of the engine so as to bring the Mach number to the regulated value as disclosed in the aforenoted application Serial No. 159,781.

Since the computer is relatively fast compared with changes in the missile Mach number, the speed of the computer servo motor 126 will be proportional to the rate-of-change of Mach number (also rate-of-change of Mach number error) and the rate-of-change of Mach number may be indicated by the device 175.

Although only one embodiment of the invention has been illustrated and described, various changes in the form and relative arrangements of the parts may be made to suit requirements.

What is claimed is:

1. The combination comprising a first variable voltage device, a second variable voltage device, ram air inlet pressure responsive means operatively connected to the first device, ambient atmospheric pressure responsive means operatively connected to the second device, a variable coupling transformer having a secondary winding and a primary winding inductively coupled thereto, means electrically connecting the second variable voltage device to said primary winding to excite the primary winding, circuit means electrically connecting said first variable voltage device in opposition to the output of said secondary winding, motor means controlled by said circuit means to adjust the coupling relation between the primary and secondary windings of said variable coupling transformer to electrically balance said circuit means, and means driven by said motor means for performing a control function.

2. The combination defined by claim 1 including a Mach number indicator driven by the motor means.

3. The combination defined by claim 1 including a generator driven by the motor means, and a rate of change of Mach number indicator operated by the generator.

4. The combination defined by claim 1 including a biasing transformer, said biasing transformer having a secondary winding electrically connected in said circuit means and a primary winding excited by the second variable voltage device.

5. The combination defined by claim 1 including a fuel-air ratio selector mechanism adjustably positioned by the motor means so as to maintain the ram air inlet pressure at a predetermined ratio of the ambient atmospheric pressure.

6. The combination defined by claim 1 including a stop mechanism for limiting the adjustment of the coupling relation of the variable coupling transformer to predetermined minimum and maximum values, and clutch means between said stop mechanism and motor means for permitting slippage of said motor means relative to said stop mechanism.

7. The combination defined by claim 1 including a variable induction transformer for operatively coupling the circuit means to said motor means, and ambient atmospheric pressure responsive means for operating said variable induction transformer so as to modify the effect of said circuit means on the motor means with changes in the ambient atmospheric pressure.

8. For use with an air fuel ratio control system of an aircraft engine; the combination comprising a first variable voltage device, a second variable voltage device, ram air inlet pressure responsive means for operating the first device, ambient atmospheric pressure responsive means for operating the second device, a first variable induction transformer having a secondary winding and a primary winding inductively coupled thereto, means electrically connecting the second variable voltage device to said primary winding to excite the primary winding, circuit means electrically connecting said first variable voltage device in opposition to the output of said secondary winding, a biasing transformer, said biasing transformer having a secondary winding electrically connected in said circuit means and a primary winding inductively coupled thereto and excited by the second variable voltage device, motor means for adjusting the coupling relation between the windings of the first variable induction transformer so as to electrically balance said circuit means, a second variable induction transformer for operatively coupling the circuit means to said motor means, ambient atmospheric pressure responsive means for operating said second variable induction transformer so as to modify the effect of said circuit means on the motor means with changes in the ambient atmospheric pressure, a fuel air ratio selector mechanism adjustably positioned by the motor means so as to maintain a predetermined ram air inlet and ambient atmospheric pressure ratio, a stop mechanism for limiting the adjustment by the motor means of the fuel air ratio selector and the coupling relation between the windings of the first variable induction transformer to within a predetermined operating range, and clutch means between said stop mechanism and motor means for permitting slippage of said motor means relative to said stop mechanism.

9. The combination defined by claim 8 including a Mach number indicator adjustably positioned by the motor means, a generator driven by the motor means, a rate of change of Mach number indicator operated by said generator, and the stop mechanism arranged to limit the adjustment by the motor means of the Mach number indicator to within said predetermined operating range.

10. For use with an air fuel ratio control system of an aircraft engine; the combination comprising a first variable voltage device, a second variable voltage device, ram air inlet pressure responsive means for operating the first device, ambient atmospheric pressure responsive means for operating the second device, a first variable induction transformer having a secondary winding and a primary winding inductively coupled thereto, means electrically connecting the second variable voltage device to said primary winding to excite the primary winding, circuit means electrically connecting said first variable voltage device in opposition to the output of said secondary winding, a biasing transformer, said biasing transformer having a secondary winding electrically connected in said circuit means and a primary winding inductively coupled thereto and excited by the second variable voltage device, motor means for adjusting the coupling relation between the windings of the first variable induction transformer so as to electrically balance said circuit means, a second variable induction transformer for operatively coupling the circuit means to said motor means, ambient atmospheric pressure responsive means for operating said second variable induction transformer so as to modify the effect of said circuit means on the motor means with changes in the ambient atmospheric pressure, and a fuel air ratio selector mechanism adjustably positioned by the motor means so as to maintain a predetermined Mach number.

11. A Mach number computer comprising a first variable voltage device, a second variable voltage device, ram air inlet pressure responsive means for operating the first device, ambient atmospheric pressure responsive means for operating the second device, a first variable induction transformer having a secondary winding and a primary winding inductively coupled thereto, means electrically connecting the second variable voltage device to said primary winding to excite the primary winding, circuit means electrically connecting said first variable voltage device in opposition to the output of said secondary winding, a biasing transformer, said biasing transformer having a secondary winding electrically connected in said circuit means and a primary winding inductively coupled thereto and excited by the second variable voltage device, motor means for adjusting the coupling relation between the windings of the first variable induction transformer so as to electrically balance said circuit means, a second variable induction transformer for operatively coupling the circuit means to said motor means, ambient atmospheric pressure responsive means for operating said second variable induction transformer so as to modify the effect of said circuit means on the motor means with changes in the ambient atmospheric pressure, and a Mach number indicator adjustably positioned by the motor means.

12. The combination defined by claim 11 including a generator driven by the motor means, and a rate of change of Mach number indicator operated by said generator.

13. The combination defined by claim 11 including a stop mechanism for limiting the adjustment by the motor means of the Mach number indicator and the coupling relation between the windings of the first variable induction transformer to within a predetermined operating range.

14. The combination defined by claim 11 including a generator, means directly connecting said motor means to said generator, a rate of change of Mach number indicator operated by said generator, a stop mechanism for limiting the adjustment by the motor means of the Mach number indicator and the coupling relation between the windings of the first variable induction transformer to within a predetermined operating range, and a clutch means between said stop mechanism and motor means for permitting slippage of said motor means relative to said stop mechanism.

15. In an aircraft a Mach number computer comprising a ram air inlet pressure responsive device, an ambient atmospheric pressure responsive device, a reversible motor, means driven by said motor for performing a control function, an electrical computer network for controlling said motor, means operatively connecting said pressure responsive devices in said network for computing the Mach number of the aircraft, said connecting means including a variable coupling transformer means, and means drivingly connecting said motor to said variable coupling transformer means for electrically balancing said network.

16. The combination defined by claim 15 including a Mach number indicator driven by the motor, a generator driven by the motor, and a rate of change of Mach number indicator operated by the generator.

17. The combination defined by claim 15 including another variable coupling transformer for operatively connecting said computer network to said motor, and ambient atmospheric pressure responsive means for operating said other variable coupling transformer to modify the effect of said network on the motor.

18. The combination defined by claim 15 including a Mach number indicator adjustably positioned by the motor, and a stop mechanism for limiting the adjustment by the motor of said indicator to a predetermined operating range within which accurate computation of the Mach number may be effected.

19. The combination defined by claim 15 including an air fuel ratio controller for an aircraft engine, said controller driven by said motor to regulate the Mach number of the aircraft to a predetermined value.

References Cited in the file of this patent

UNITED STATES PATENTS

| | | |
|---|---|---|
| 2,336,492 | MacKay | Dec. 14, 1943 |
| 2,521,244 | Moore | Sept. 5, 1950 |
| 2,549,621 | Moore | Apr. 17, 1951 |